United States Patent [19]

Allos

[11] Patent Number: 4,707,760
[45] Date of Patent: Nov. 17, 1987

[54] MAINS PROTECTION DEVICE

[75] Inventor: Janan E. Allos, Walton-on-Thames, United Kingdom

[73] Assignee: Sollatek Limited, Monrovia, Liberia

[21] Appl. No.: 781,226

[22] Filed: Sep. 27, 1985

[51] Int. Cl.[4] .............................................. H02H 3/20
[52] U.S. Cl. .......................................... 361/90; 361/86; 361/187; 307/140
[58] Field of Search .......................... 361/56, 86, 88, 90, 361/187, 92; 307/38, 130, 140; 340/660, 662, 663

[56] References Cited

U.S. PATENT DOCUMENTS

| 3,611,162 | 10/1971 | Tochitani | 361/90 X |
| 3,836,790 | 9/1974 | Becker | 361/90 X |
| 4,510,549 | 4/1985 | Tedesco | 361/92 X |
| 4,541,029 | 9/1985 | Ohyama | 361/90 X |
| 4,584,623 | 4/1986 | Bello et al. | 361/90 |

FOREIGN PATENT DOCUMENTS

| 285870 | 2/1927 | United Kingdom . |
| 317018 | 8/1928 | United Kingdom . |
| 445142 | 5/1934 | United Kingdom . |
| 868253 | 5/1961 | United Kingdom . |
| 961349 | 6/1964 | United Kingdom . |
| 1022964 | 3/1966 | United Kingdom . |
| 1254975 | 11/1971 | United Kingdom . |
| 1261995 | 2/1972 | United Kingdom . |
| 1372331 | 10/1974 | United Kingdom . |
| 1424550 | 2/1976 | United Kingdom . |
| 1516674 | 7/1978 | United Kingdom . |

Primary Examiner—A. D. Pellinen
Assistant Examiner—Derek S. Jennings
Attorney, Agent, or Firm—Pravel, Gambrell, Hewitt, Kimball & Krieger

[57] ABSTRACT

A mains protection device for a.c. mains comprises a circuit for detecting whether or not the mains voltage is within an amplitude window. When the voltage goes above or below the window, the mains is disconnected from an appliance and when the voltage returns to within the window for a preset time, the mains is reconnected to the appliance.

18 Claims, 2 Drawing Figures

MAINS PROTECTION DEVICE

BACKGROUND OF THE INVENTION

This invention relates to a protection device for electricity supplies.

Certain electrical devices, for example refrigerators, freezers, and air conditioning units, are highly susceptible to variations and transients in a mains voltage supply, particularly when the supply is interrupted and then restored. Such variations in the supply can damage the appliance, or shorten its working life.

There has previously been proposed an Automatic Voltage Regulator (AVR), which regulates a supply voltage to an appliance connected to the AVR if the supply voltage is within certain limits. An AVR, however, has disadvantages in that if the supply voltage passes outside the limits of the AVR, the appliance will remain connected and can still be damaged; also an automatic voltage regulator can be costly.

SUMMARY OF THE INVENTION

According to the present invention, there is provided a protection device for an a.c. mains operated appliance, comprising means for comparing the peak value of selected half cycles of the mains with upper and lower limits defining a range relative to the mains voltage and means for providing a first signal state when the comparison indicates that the peak value is not within the range and a second signal state when said peak value subsequently remains with the range for a predetermined time interval.

An embodiment of the present invention can provide circuitry for protecting appliances connected thereto from undesirable transients in an a.c. mains supply by causing the appliance to be disconnected from the mains by said first signal state during such transients, and to be reconnected, by said second signal state, only after the mains supply has remained sufficiently constant for a predetermined time.

It will be apparent that the range may well be maintained substantially the same relative to the mains voltage for all tests, although embodiments can be designed for which the range is varied, e.g. in dependence upon the signal states. There is advantage in reducing the range when the first signal state occurs and subsequently to expand the range when the peak value first goes within the second range.

BRIEF DESCRIPTION OF THE DRAWINGS

Reference will now be made, by way of example, to the accompanying drawings, in which.

DESCRIPTION OF PREFERRED EMBODIMENTS

Figure 1:
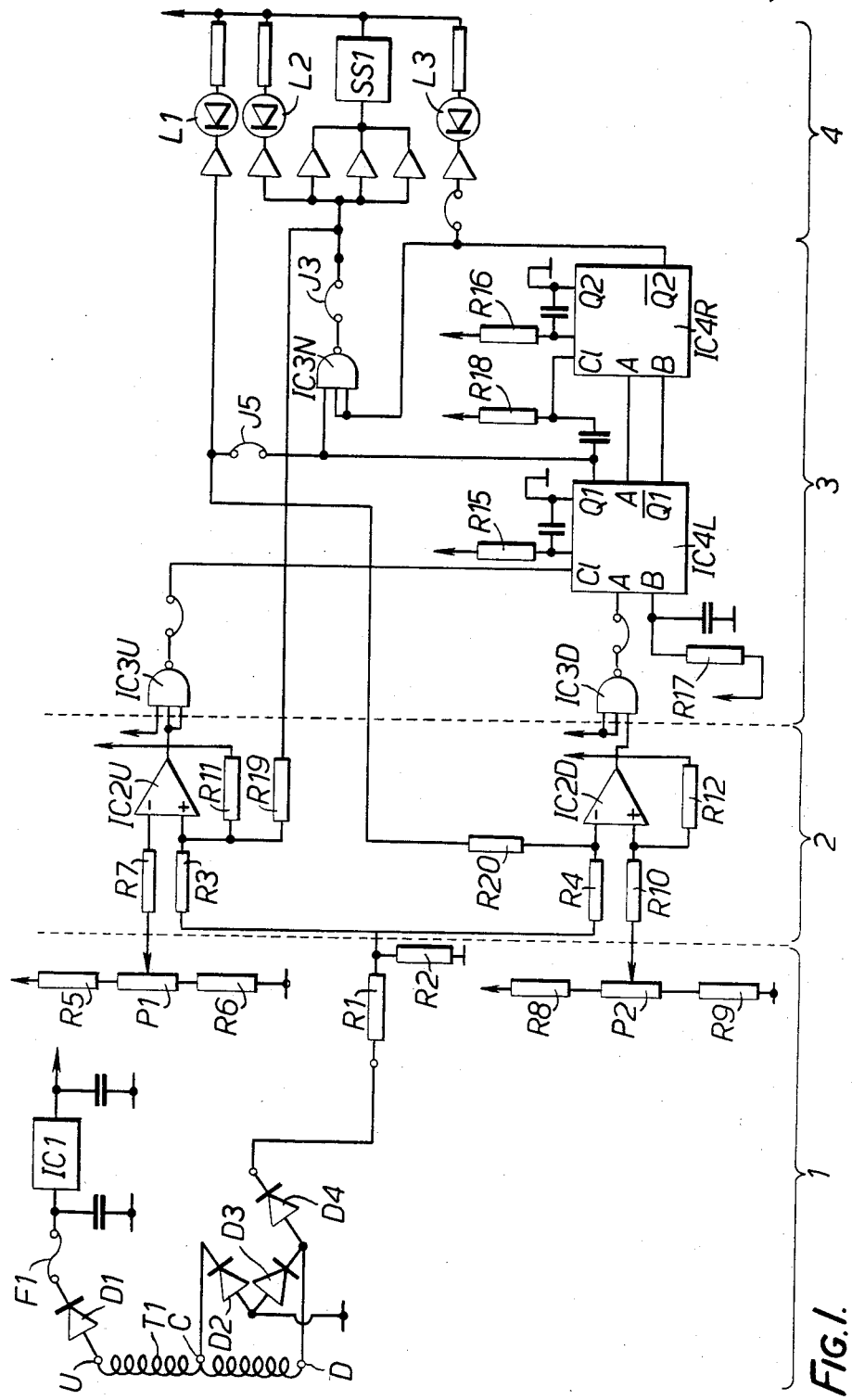
FIG. 1 shows circuitry embodying the present invention.

The circuitry of FIG. 1 comprises voltage supply circuitry 1, for supplying a regulated supply voltage and the mains voltage to be monitored; voltage comparison circuitry 2; control circuitry 3; and output and status display circuitry 4.

The circuitry 1 comprises a transformer T1 providing from the mains a.c. supply voltage (not shown) an approximately 12 volt r.m.s. output, and having terminals U and C and D. The terminal U is connected, by way of a diode D1 and fuse F1, to a voltage regulator IC1 (type 78L05). The terminal C is connected to a second diode D2, which in turn is connected to ground, and also by way of a forward facing diode D3 to the terminal D. Also connected to the terminal D is a forward facing diode D4. In operation, when U is positive, D1 and D3 conduct, energizing the voltage regulator IC1 with a 12 volt half cycles, so that even when the a.c. mains voltage goes down to less than half of its rated value, the voltage regulator will still be able to give a desired 5 volt supply and reference voltage. When D is positive (U negative), D2 and D4 conduct, applying a positive 6 volt half cycle to a voltage divider R1, R2 connected to D4. It should be noted that this is a different half cycle from that supplying the voltage regulator, and hence will be unlikely to disturb the monitored voltage at the junction of R1 and R2 when the voltage comparison circuitry is operative and drawing current at its input.

The voltage comparison circuitry comprises first and second voltage comparators (type LM319), IC2U and IC2D, the output of each which voltage comparators, when the circuitry is in use, being positive when the voltage on its negative terminal is less than that on its positive terminal. Two reference voltages are set at respective ones of the first and second voltage comparators by respective first and second potential dividers, R5, P1, R6, and R8, P2, R9. The variable supply voltage is applied to each voltage comparator by the potential divider R1, R2. Also connected to inputs of the comparator are respective feedback resistors R19 and R20.

The outputs of the first and second voltage comparators are connected via respective NAND gates IC3U and IC3D to the "C1" and "A" inputs of a first retriggerable monostable multivibrator IC4L (type 4538B), having a relaxation period of approximately 30 ms. This period could be of other durations greater than 20 ms; e.g. 100 ms so that an appliance will not be switched off until the mains stays outside the window for five cycles. The "Q1" output of the monostable multivibrator IC4L is connected to a first input of a NAND gate IC3N and also to the "C1" input of a second monostable retriggerable multivibrator, IC4R (part of 4538B), having a relaxation time of approximately 1 minute. The "A" input of the second monostable multivibrator is also connected to the output of the lower voltage comparator, and the "$\overline{Q2}$" output of that multivibrator is connected to the second input of the NAND gate IC3N. The first input of the NAND gate is also connected to a first LED L1, and the second input of the NAND gate is connected to a second LED, L3. The output of the NAND gate is connected to a third LED, L2 in parallel with a switching relay SS1.

In normal operation, when the supply voltage is within an acceptable "window" between the upper and lower limits set by the voltage comparators, the "Q2" output of the multivibrator IC4R is at logic 1. In such normal operation, during evey a.c. cycle the voltage of the cycle will exceed the low-level voltage limit on the lower voltage comparator, IC2D. This causes a pulse to be applied each cycle to the inputs "A" of the monostable multivibrators IC4L and IC4R. The pulse re-triggers the multivibrator IC4L, but does not cause the multivibrator IC4R to be re-triggered, as the "A" input of this multivibrator is rendered inactive by the absence of a logic 1 signal at its "B" input (pin 5). As the multivibrator IC4L is re-triggered every ac cycle (20 ms for 50 Hz) the output "Q1" is maintained in a logic 1 state. As the multivibrator IC4R is not re-triggered, the output "$\overline{Q2}$" is in a logic 1 state. Thus, all inputs of the NAND gate IC3N are logic 1, and consequently its output is low, thereby lighting the LED L2, and maintaining the switching relay SS1 in an "ON" state to maintain power to an appliance. The window might be set at ±5% to ±15% of the peak rated value for the mains, and in one preferred embodiment it is set at 200 V to 250 V for a rated value of 230 V, i.e. about ±10 to 13%.

In the event of a low voltage state existing for at least one cycle, the low-level voltage limit on the lower voltage comparator IC2D will not be exceeded, and consequently no pulse will be applied to the inputs "A" of the monostable multivibrators. Consequently, the output "Q1" of the multivibrator IC4L will go to the logic 0 state, and the output "$\overline{Q1}$" will go to the logic 1 state. With the output "Q1" thus in a low state, the LED L1 will be lit, and the NAND gate IC3N will have a logic 1 output, extinguishing the LED L2, and triggering the switching relay SS1 to turn off an appliance.

In the event of an over voltage for at least one cycle, the voltage comparator IC2U, which normally supplies a steady logic 1 signal to the clear terminal 13 of the multivibrator IC4L, will cause a zero pulse to be applied to that terminal, thereby clearing the multivibrator. This in turn will cause a zero pulse to be applied to the multivibrator IC4R, so ensuring that "Q1" and "Q2" are both zero. As for the under voltage state the LED L1 will be caused to be lit, the LED L2 will be extinguished, and the switching relay SS1 will be triggered to turn off an appliance.

It is noted here that the feedback via resistors R19 and R20 introduces a slight hysteresis, so that once relay SS1 is switched to its appliance "off" state, the window is effectively narrowed slightly. This avoids the hunting which would occur if the mains were on average just outside the window but varied slightly so as intermittently to enter the original window. When the peak value returns within the second window, that window is expanded so as to return substantially to its original value.

The hysteresis is applied to the overvoltage comparator from J3, widening the window when L2 is lit. It is applied to the undervoltage comparator from J5, narrowing the window when L1 is lit and widening the window for L2 or L3 being lit. This was found easier to implement, as well as more appropriate, so that if the mains voltage is close to the overvoltage, the device will fluctuate between L3 on and L1 on, without L2 going on. If it is critical on the low side, then once L2 or L3 is lit, it will stay there, even though the voltage may go down slightly as a result of an appliance switching on. However, hysterisis can be introduced in any other way, as may be required.

When, after such an over-or under-voltage condition, the voltage returns to a range within the "window", the first pulse from the lower voltage comparator IC2D will cause the "Q1" and "Q2" outputs of the multivibrators IC4L and IC4R to go to logic 1. In the absence of a pulse received at pin 13 from the upper voltage comparator IC2U, the multivibrator IC4L will be maintained in this state by subsequent pulses from the lower voltage comparator IC2D, while the multivibrator IC4R will be maintained in this state only until its relaxation period has elapsed. Until the end of its relaxation period, the output "Q2" will be at logic zero, causing the LEDL3 to be lit, and maintaining the switching relay SS1 in an off state. At the end of the relaxation period, the relay IC4R will return to having "Q2" at logic 1, the NAND gate IC3N will have both inputs at logic 1, and the switching relay SS1 and LEDL2 will thus be returned to a on state.

For low power appliances, e.g. up to 2 Amp, relay SS1 may have its contacts directly in series with the power supply to the appliance. For higher power, relay SS1 can drive a further, higher power, relay in the appliance power supply.

In summary, the described embodiment detects when the peak of the instantaneous value of alternate half cycles of the mains goes outside a predetermined range to provide a first signal state, i.e. a high condition at the output of NAND gate IC3N. When the peak value subsequently returns within range, multivibrator IC4R acts as a one minute timer to produce a second signal state (a low state at the output of NAND gates IC3N) at the end of that period if the peak remains within range. Thus, not only can an appliance be automatically switched off when an unacceptable voltage swing occurs, but also it will only be re-energised when the device recognises a stable resumption of power. Damaging voltage swings such as are to be detected by the present device normally do not occur in the United Kingdom, but are not unfrequent in other parts of the world.

Figure 2:
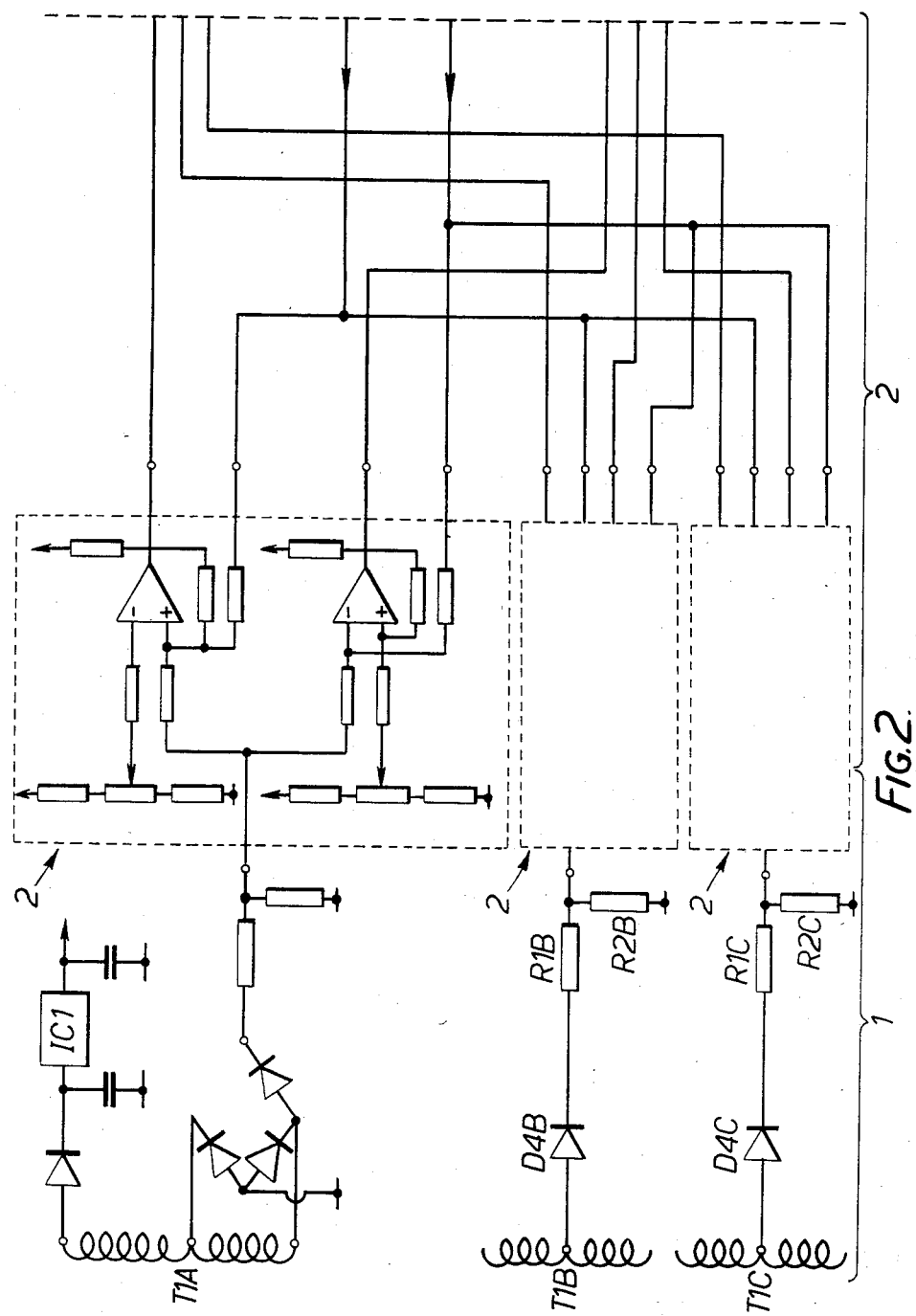
FIG. 2 shows a modification of FIG. 1.

FIG. 2 shows an embodiment of the present invention adapted for use with a three-phase supply. In this embodiment, there are three pairs of voltage comparators 2, each substantially as described with reference to FIG. 1. The pairs of voltage comparators monitor respective phases of the supply, but all the comparators share a single voltage supply, taken from a first transformer T1A, with voltage regulator and diodes as shown in FIG. 1. The other phases of circuitry are supplied simply by transformers T1B and T1C, diodes D4B and D4C and potential dividers R1B, R2B and R1C, R2C.

The outputs of the comparators go to the NAND gates IC3U and IC3D, so that FIG. 2 should be regarded as a replacement of that portion of FIG. 1 to the left of the dotted line. Thus the circuitry 3 and 4 of FIG. 1 is also used in the embodiment of FIG. 2. However the relaxation time of IC4L could be made greater than 6.67 ms and less than 13.33 ms to obtain the desired response even if only one phase is disturbed.

I claim:

1. A protection device, for an a.c. mains operated appliance, comprising:
   means for defining upper and lower limits for a range of mains voltage values;
   means for comparing the voltage peak value of selected half cycles of the mains with said upper and lower limits;
   means for defining a predetermined time interval; and
   means for providing a first signal state for disconnecting the appliance from the mains when the comparison indicates that said peak value is not within said range and a second signal state for reconnecting the appliance to the mains when said peak value subsequently remains within said range for said predetermined time interval.

2. A device as claimed in claim 1, wherein the limit defining means comprise means for defining said limits as reference voltages obtained from mains half cycles other than said selected half cycles.

3. A device as claimed in claim 1, wherein said selected half cycles are alternate half cycles.

4. A device as claimed in claim 1, wherein the comparing means comprises two comparators for comparing the instantaneous values of said selected half cycles with the values of the limits.

5. A device as claimed in claim 1, wherein said means for providing the first signal state comprises a timing device for signalling when the peak value is not within the range during a first time interval shorter than said predetermined time.

6. A device as claimed in claim 1, for three-phase operation, and comprising three respective peak value comparing means coupled to first common means for signalling an out-of-range condition and second common means for defining the predetermined time interval.

7. A protection device, for an a.c. mains operated appliance, comprising:
   means for defining upper and lower limits for a range of mains voltage value;
   means for comparing the voltage peak value of selected half cycles of the mains with said upper and lower limits, the limit defining means comprising voltage regulation means for supplying reference voltages for defining said limits from mains half cycles other than said selected half cycles;
   means for defining a predetermined time interval; and
   means for providing a first signal state for disconnecting the appliance from the mains when the comparison indicates that said peak value is not within said range, and a second signal state for reconnecting the appliance to the mains when said peak value subsequently remains within said range for said predetermined time interval.

8. A device as claimed in claim 7, wherein said selected half cycles are alternate half cycles.

9. A device as claimed in claim 7, wherein the comparing means comprises two comparators for comparing the instantaneous values of said selected half cycles with the values of the limits.

10. A device as claimed in claim 7, wherein said means for providing the first signal state comprises a timing device for signalling when the peak value is not within the range during a first time interval shorter than said predetermined time.

11. A device as claimed in claim 7, for three-phase operation, and comprising three respective peak value comparing means coupled to common means for signalling an out-of-range condition and second common means for defining the predetermined time interval.

12. A protection device, for an a.c. mains operated appliance, comprising:
    means for defining upper and lower limits for a range of mains voltage values;
    means for comparing the voltage peak value of selected half cycles of the mains with said upper and lower limits;
    means for defining a predetermined time interval;
    means for providing a first signal state for disconnecting the appliance from the mains when the comparison indicates that said peak value is not within said range and a second signal state for reconnecting the appliance to the mains when said peak value subsequently remains within said range for said predetermined time interval; and
    means for altering said upper and lower limits in dependence upon the signal states to alter the range relative to the mains voltage.

13. A device as claimed in claim 12, wherein the altering means are so responsive to the first signal state that the limit giving rise to the first signal state is altered, relative to the mains voltage, in the sense to make the range smaller relative to the mains voltage.

14. A device as claimed in claim 13, wherein the altering means is operable to obtain a scaled proportion of the mains voltage for comparison with said limits, the scaling being responsive to the first signal state to alter said limit relative to the mains voltage.

15. A device as claimed in claim 12, wherein said selected half cycles are alternate half cycles.

16. A device as claimed in claim 12, wherein the comparing means comprises two comparators for comparing the instantaneous values of said selected half cycles with the values of the limits.

17. A device as claimed in claim 12, wherein said means for providing the first signal state comprises a timing device for signalling when the peak value is not within the range during a first time interval shorter than said predetermined time.

18. A device as claimed in claim 12, for three-phase operation, and comprising three respective peak value comparing means coupled to common means for signalling an out-of-range condition and second common means for defining the predetermined time interval.

* * * * *